(12) United States Patent
Dounaev et al.

(10) Patent No.: US 7,187,720 B2
(45) Date of Patent: Mar. 6, 2007

(54) NOISELESS DATA TRANSMISSION METHOD

(76) Inventors: Igor Borisovich Dounaev, ul. Gogolya, 14a-48, Khimki Moskovskaya obl. 141400 (RU); Leonid Alexeyevich Letounov, MZHK "Solnechny", 2-105, Gomel 246050 (BY)

( * ) Notice: Subject to any disclaimer, the term of this patent is extended or adjusted under 35 U.S.C. 154(b) by 575 days.

(21) Appl. No.: 10/490,090

(22) PCT Filed: Mar. 20, 2002

(86) PCT No.: PCT/RU02/00103

§ 371 (c)(1),
(2), (4) Date: Mar. 18, 2004

(87) PCT Pub. No.: WO03/032595

PCT Pub. Date: Apr. 17, 2003

(65) Prior Publication Data

US 2004/0252780 A1    Dec. 16, 2004

(30) Foreign Application Priority Data

Oct. 8, 2001   (RU) .............................. 2001127208

(51) Int. Cl.
*H04B 15/00*   (2006.01)
(52) U.S. Cl. ............... 375/285; 375/219; 375/296; 375/340; 375/342
(58) Field of Classification Search ........ 375/259, 375/296, 346, 219, 340, 342
See application file for complete search history.

(56) References Cited

U.S. PATENT DOCUMENTS 4,336,612 A *  6/1982  Inoue et al. ............... 714/755
7,110,465 B2 *  9/2006  Kaku et al. ............... 375/285
2002/0136281 A1 *  9/2002  Grohn ....................... 375/219
2006/0098746 A1 *  5/2006  Candy et al. .............. 375/259

* cited by examiner

*Primary Examiner*—Vu Le
*Assistant Examiner*—Duy Hoang
(74) *Attorney, Agent, or Firm*—Notaro & Michalos P.C.

(57) ABSTRACT

The method of noise-immune information transmission of the present invention permits to increase the communication channel capacity without reducing the noise immunity of information being transmitted. In this method, informational digital samples are transmitted in the form of analog signal supplemented with a redundant information signal. The technical result is obtained owing to the fact that at the transmitting side: selecting at least one benchmark point between informational samples; in each selected benchmark point, determining an analog signal value to which said informational digital samples are converted using a second sampling function; converting the samples in the benchmark points to the redundant information signal in order to supplement said analog signal; selecting a difference between power levels for transmitting the most significant bits of each informational sample depending on a predetermined signal-to-noise ratio at the input of the receiving side, and selecting the power levels for transmitting the samples of the benchmark points, a difference between which power levels is less than a difference selected for a power levels of the most significant bits; at the receiving side: according to the recovered digital samples, discovering the least significant bits by subtraction of the most significant bits; according to the discovered least significant bits, constructing an envelope using a second sampling function and discovering a value of this envelope in a respective benchmark point; comparing the discovered value of the envelope in the specific benchmark point with the corresponding value recovered from the received signal; in the case of lack of coincidence of compared values, choosing a set of digital samples which set ensures the coincidence, which is the correction.

5 Claims, 3 Drawing Sheets

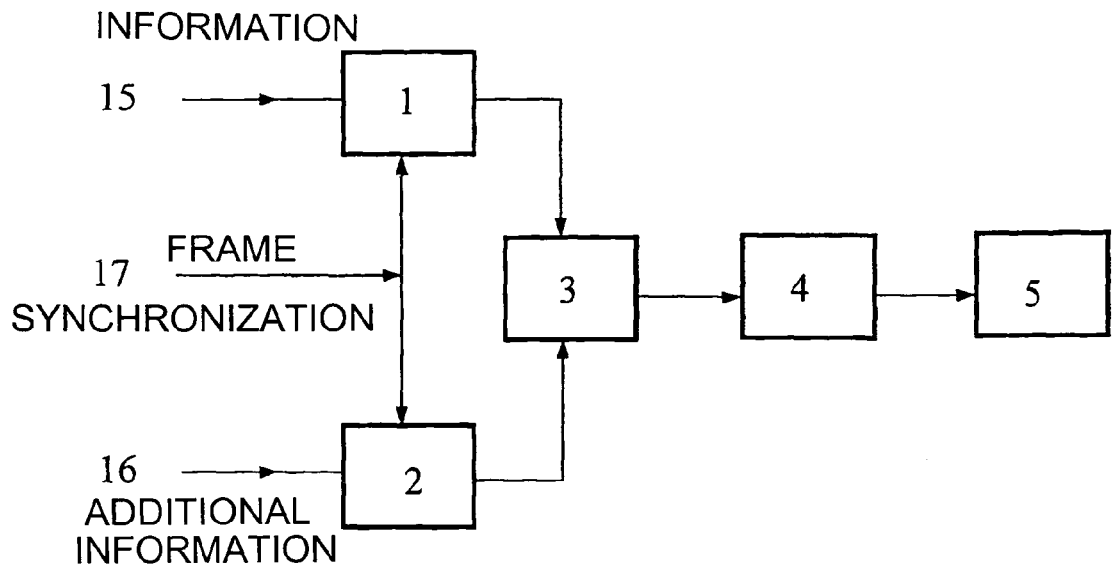
FIG. 1
FIG. 2
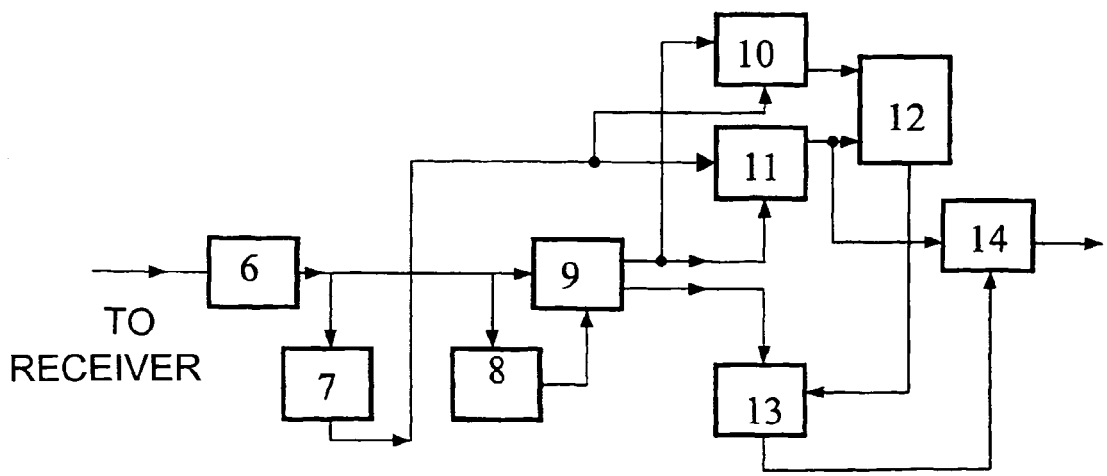

NOISELESS DATA TRANSMISSION METHOD

FIELD OF THE INVENTION

This invention relates to the method of noise-immune information transmission and could be employed in communicating, measuring and other systems.

BACKGROUND OF THE INVENTION

At present, many methods for increasing a noise immunity of information being transmitted using various error-detecting and/or error-correcting codes are known.

The closest analog is a method of noise-immune information transmission including steps of: at the transmitting side: converting a sequence of k-bit informational digital samples (k is an integer, k>1) to an analog signal using a first sampling function; supplementing the obtained analog signal with a redundant information signal; transmitting the supplemented analog signal over a communication line; at the receiving side: receiving the transmitted analog signal from the communication line; recovering from the received analog signal said sequence of informational digital samples; correcting the recovered informational digital samples using the redundant information (В. Л. Банкет, В. М. Дорофеев. Цифровые методы в спутниковой связи. [V. L. Banket, V. M. Dorofeyev. Digital methods in satellite communications.]—Москва: Радио и связь [Moscow, Radio and Communications], 1988, pp. 131–142 —in Russian).

The disadvantage of this method is in a small channel capacity due to the fact that the redundant information forms up to a half of the information being transmitted.

SUMMARY OF THE INVENTION

Thus, the object of the present invention is to provide such a method of noise-immune information transmission, which permits to increase the communication channel capacity without reducing the noise immunity of information being transmitted.

In order to solve this task, a method of noise-immune information transmission including steps of: at the transmitting side: converting a sequence of k-bit informational digital samples (k is an integer, k>1) to an analog signal using a first sampling function; supplementing the obtained analog signal with a redundant information signal; transmitting the supplemented analog signal over a communication line; at the receiving side: receiving the transmitted analog signal from the communication line; recovering from the received analog signal said sequence of informational digital samples; correcting the recovered informational digital samples using the redundant information,—in accordance with the present invention, the method includes steps of: at the transmitting side: for each of n time intervals (n is an integer, n>1) consisting of m informational digital samples (m is an integer, m>1), selecting at least one benchmark point between informational samples; in each selected benchmark point, determining an analog signal value, to which said m informational digital samples of the given time interval are converted using a second sampling function, in the form of (k−i)-bit sample being the least significant bits of k-bit sample (i is an integer depending on a value of operation threshold of demodulator employed at the receiving side, k>i>1); converting the samples in the n benchmark points to said redundant information signal at additional time intervals in order to supplement said analog signal; selecting a difference between power levels for transmitting the most significant i bits of each k-bit informational sample depending to a predetermined signal-to-noise ratio at the input of the receiving side, wherein, selecting the power levels for transmitting said (k−i)-bit samples of the benchmark points, a difference between which power levels is less than a difference selected for a power levels intended for transmitting said most significant i bits in order to have a greater protectivity of said most significant bits from interference; at the receiving side: according to the digital k-bit samples recovered from the received signal, discovering the least significant (k−i) bits by subtraction of the most significant i bits from said recovered samples; according to the discovered least significant (k−i) bits, constructing an envelope using a second sampling function and discovering a value of this envelope in a respective benchmark point; comparing the discovered value of the envelope in the specific benchmark point with the corresponding value recovered from the received signal; in the case of coincidence of the compared values with a predetermined accuracy, deciding on a correct receiving of digital samples at the respective time interval; in the case of lack of such coincidence of said compared values, choosing a set of (k−i)-bit digital samples, which set ensures the coincidence, which is the correction.

An additional feature of the method according to the present invention is in that the method includes a step of selecting, at each time interval, e.g., one benchmark point between the m-th informational digital sample of this time interval and the first informational digital sample of the next time interval, or selecting, at each time interval, two benchmark points between the digital samples of this time interval.

In this case, each benchmark point could be selected in the middle of the time space between respective digital samples.

Values of quantities n, m, k are chosen in the following limits: 1<n<128, 8<m<8192, 2<k<14.

BRIEF DESCRIPTION OF DRAWINGS

The present invention will be explained using the description of its embodiments, when taken together with references to the accompanying drawings, where:

FIG. 1 illustrates a block diagram of the transmitting side of communication system implementing the method according to the present invention;

FIG. 2 illustrates a block diagram of the receiving side of communication system implementing the method according to the present invention;

DETAILED DESCRIPTION OF THE INVENTION

Figure 3:
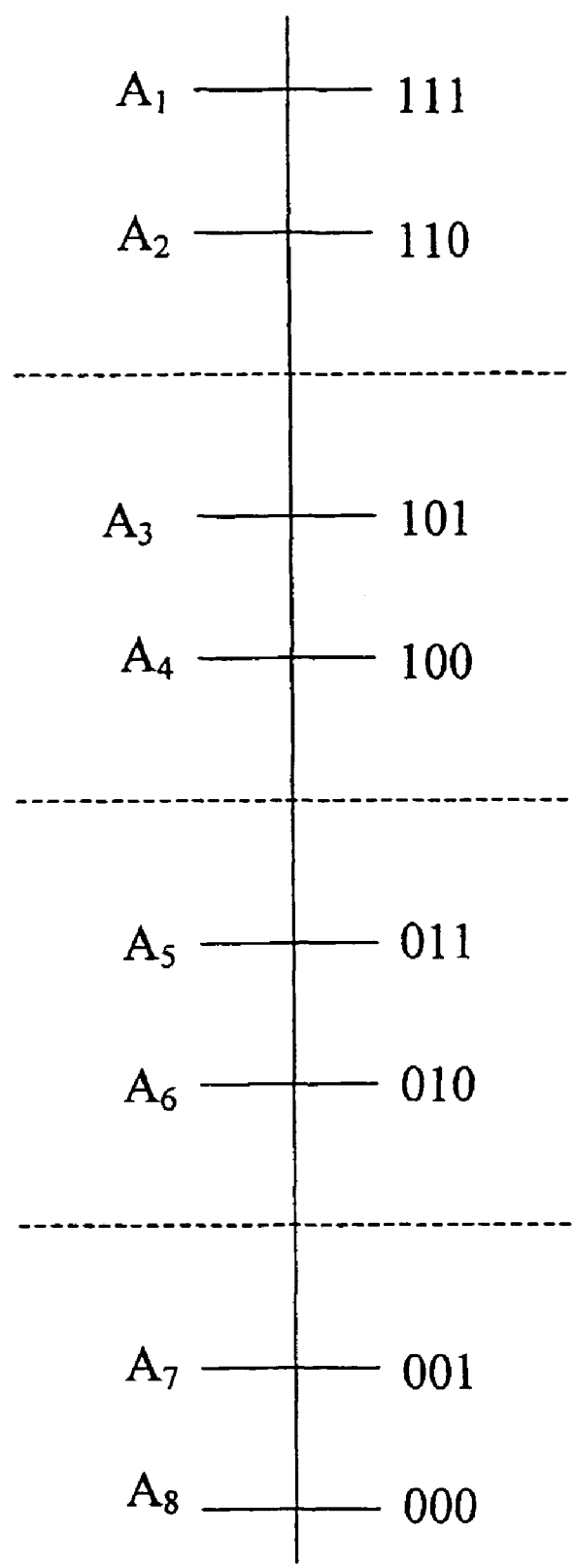
FIG. 3 shows an approximate relationship between power levels of bits of information sample.

The method of noise-immune information transmission according to the present invention is implemented, for example, in communication system the block diagrams of which transmitting and receiving sides are illustrated in FIG. 1 and 2, respectively.

Referring to FIG. 1, the transmitting side of communication system comprises an envelope former 1, a redundant information former 2, a summer 3, and a unit 4 of one-sideband transfer to carrier frequency. Information inputs of the formers 1 and 2 are, respectively, the first and the second information inputs 15 and 16, and synchronization inputs of the formers 1, 2 are joined into the frame synchronization input 17. Outputs of the formers 1 and 2 are coupled to inputs of the summer 3 which output is connected to an input of the unit 4 of one-sideband transfer to carrier frequency, which output is connected to an input of a communication channel 5, e.g., a radio wireless line.

In the diagram of FIG. 1, the first envelope former 1 accomplishes the conversion of digital samples of information sequence to multilevel signals. The redundant information former 2 converts the digital samples of benchmark points of the same information sequence to multilevel signals which number of levels is less than the number of levels in signals at the output of the envelope former 1. The unit 4 of one-sideband transfer to carrier frequency could be any of known units, which ensures the one-sideband modulation of the carrier frequency with a sum signal from the summer 3.

Referring now to FIG. 2, the receiving side of this communication system comprises a unit 6 of one-sideband transfer from carrier frequency, a clock frequency extractor 7, a frame synchronization extractor 8, a main and redundant information divider 9, a first and second analog-to-digital (A/D) converters 10 and 11, a least significant bit extractor 12, a least significant bit restorer 13, and an output message former 14. An input of the unit 6 is connected to an output of the communication channel 5. An output of the unit 6 is coupled with inputs of the clock frequency extractor 7 and frame synchronization extractor 8, and with an information input of the main and redundant information divider 9. A first and second outputs of the divider 9 are connected, respectively, to information inputs of the first and second A/D converters 10 and 11 which clock inputs are connected to an output of the clock frequency extractor 7. An output of the frame synchronization extractor 8 is coupled with a synchronization input of the divider 9 which second output is coupled also with a first input of the least significant bit restorer 13. Outputs of the A/D converters 10 and 11 are coupled with inputs of the least significant bit extractor 12 which output is connected to a second input of the restorer 13 which output and an output of the second A/D converter 11 are coupled with a first and second inputs of the output message former 14 which output is the output of the receiving side. Functions performed by the units of the receiving side will be described later.

The method of noise-immune information transmission according to the present invention is realized in the communication system shown in FIG. 1 and 2 as follows.

An information message comes to the information input 15 in the form of k-bit digital samples. The quantity k is chosen based on respective protocols for the employed communication line (e.g., protocols V32, V34, V92 for telephony; International norms 308, 309, 310 for radio communications). In the envelope former 1, values of a multilevel signal are associated with these samples. FIG. 3 shows a distribution of levels in the multilevel signal for the case of k=3. In this case, the levels (amplitudes or energies) are distributed unevenly: in FIG. 3 pairs of levels of the multilevel signal are spaced at a greater interval than levels in a pair. Owing to this, among levels of the multilevel signal always are the levels corresponding to the prohibited code words. In general, these different relationships depends on a predetermined signal-to-noise ratio in the communication system.

Figure 4:
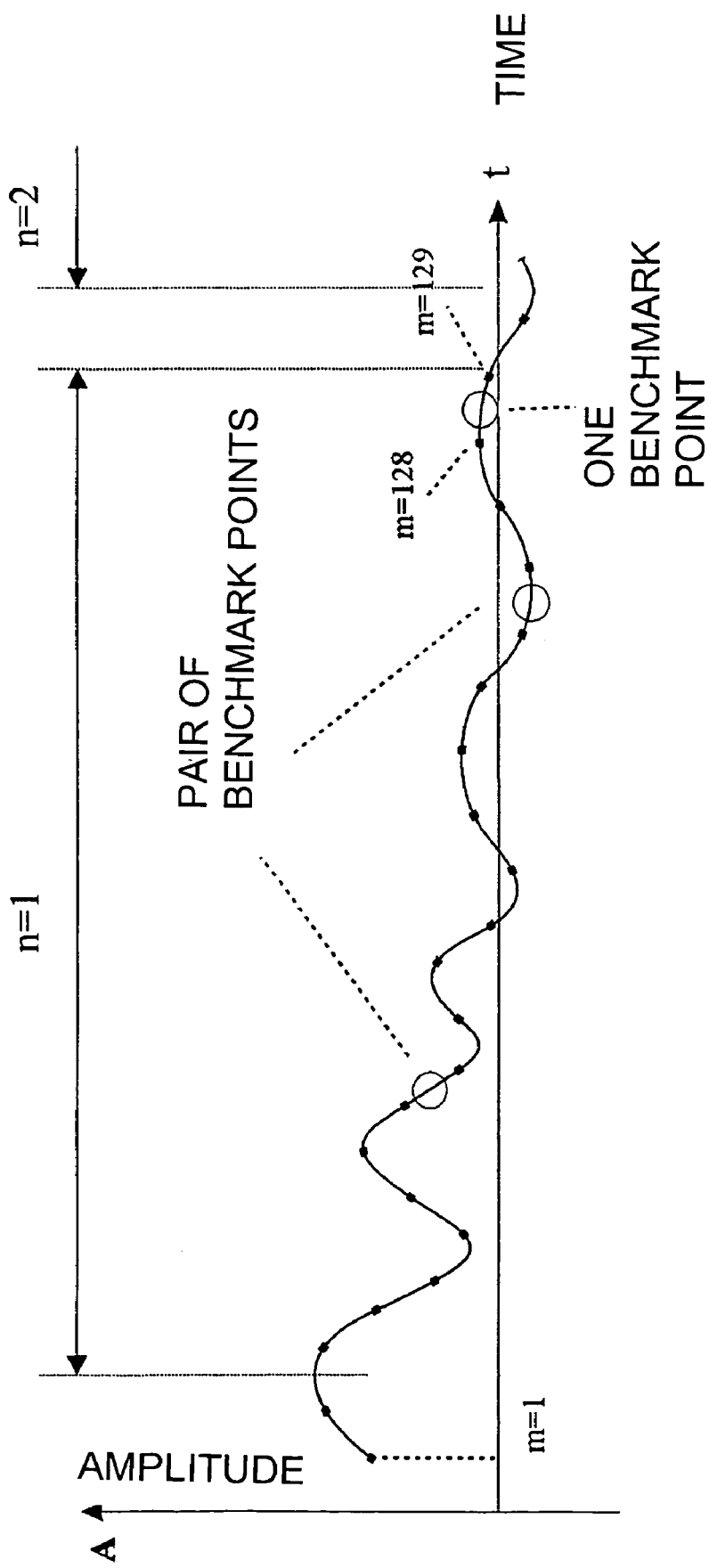
FIG. 4 shows an arrangement of benchmark points between samples of adjacent time intervals.

A waveform provided at the output of the former 1 is shown in FIG. 4. In this description, the questions of frame and clock synchronization are not considered, since these both types of synchronization could be ensured using any known method and are not included into the patent claim scope of the present invention.

As could be seen from FIG. 4, a frame of digital samples, or a time interval of the processing comprises m digital samples (for instance, m=128). At each time interval, benchmark points are selected, which are disposed between the digital samples. Minimum number of these points at one time interval is 1. In this case, the benchmark point is selected between the last (m-th) digital sample of the given time interval and the first digital sample of the next time interval. When the number of benchmark points is greater, they are disposed inside one time interval. Preferably (although not obligatory) to dispose benchmark points in the middle between digital samples.

In the benchmark points, respective digital samples are determined, these digital samples for benchmark points having lesser number of bits (k−i) than information digital samples. For instance, i=1, then for k=3 the samples of benchmark points have only two bits. These samples in the benchmark points are obtained by means of constructing an analog signal from digital samples using some predetermined sampling function. This could be, for example, the well-known function of the type $$\frac{\sin x}{x},$$

or other function, for example, the function of the type $$\frac{\sin x \left( \cos \frac{x}{n} - 1 \right)}{2n \sin \frac{x}{n}}.$$

The sum signal of sampling functions multiplied by respective digital samples will define the sample of this benchmark point.

These (k−i)-bit samples come to the information input of the redundant information former 2 which, like the former 1, converts the digital samples of benchmark points to values of the multilevel signal having, however, lesser number of levels than the signal in the former 1. In the above example the number of these levels in the signal of the former 2 is four.

Each of formers 1 and 2 comprises a buffer for temporary storing the converted signals. This is done in order to provide several frames (time intervals of processing) of the transmitted message, for example, by one frame which gathers samples of benchmark points from the indicated several frames. In the aforesaid case, it is possible to transmit in one frame of 128 samples the values of eight benchmark points, being coded by sixteen samples. If the information message has 32 time intervals, and benchmark points are selected by one at their borders, then in order to transmit 32 benchmark points, only 4 time intervals are required. In the summer 3 is performed a summation of multilevel signals from the former 2 during 4 time intervals, and then—from the former 1 during 32 time intervals. The result signal in the form of common envelope is supplied to the unit 4 which carries out a one-sideband modulation of the sum signal and transferring of the signal to a carrier frequency. It is possible to employ in this case the same sampling function as the previously described one, although it is preferable to employ another sampling function for the purpose of transmission. The signal from the output of the unit 4 comes to the communication channel 5. In this description, the problems of transferring a signal to a carrier frequency, as well as the problems of transmitting a signal over a communication channel are not considered, since these operations could be performed by means of any known technique and are not included into the patent claim scope of the present invention.

After passing the communication channel 5, the sum envelope could acquire some distortions due to interference in a real communication channel 5. This leads to a distortion of some values of the sum envelope. However, owing to the fact that the signal being formed in the former 1 has spaced groups of levels, the most significant bits of the information signal, i.e., the most significant bits of k-bit samples will be decoded correctly. This means that at the receiving side it is possible, substantially always, to refer a transmitted value to one or other pair of levels (see FIG. 3). In the case, when values k and i differs from the values in the above-cited example (3 and 1, respectively), the form of multilevel signal will differ from the one shown in FIG. 3. But in any case, i most significant bits will be transmitted with a greater noise immunity than other bits, and therefore, they could be determined substantially without errors.

At the receiving side (see FIG. 2), the unit 6 transfers the received signals from a carrier frequency. The extractors 7 and 8 ensures an extraction from the received signal the clock frequency and the frame synchronization frequency, respectively, which are used then in the consequent units of the receiving side. Particularly, the frame synchronization signal from the extractor 8 is supplied to the divider 9 to demarcate groups of frames (groups of time intervals) so as they were grouped at the transmitting side. Transferring a signal from a carrier frequency and extracting the clock frequency and the frame synchronization frequency are performed by means of any appropriate known techniques, which is not in the patent claim scope of the present invention.

The divider 9, according to the signals of frame and clock synchronization, ensures at its first and second outputs, respectively, the signals by which the information message was encoded, and the signals by which the values in benchmark points are encoded. Each of these divided signals is supplied to its own A/D converter 10 and 11, from which outputs the digital samples come to the inputs of the least significant bit extractor 12. In this extractor 12, the most significant bits are subtracted from the received signals. From the output of the extractor 12 the least significant bits of the information signal are supplied to the respective input of the least significant bit restorer 13. To another input of this restorer 13 are supplied the values of benchmark points extracted from the received signal. In the restorer 13, according to the least significant bits discovered in the extractor 12, the envelope of the received information samples is constructed using the same sampling function as at the transmitting side for defining an envelope value in a benchmark point. This envelope, due to the influence of noise (interference) at the least significant bits in the communication channel 5, will, perhaps, differ from the envelope at the transmitting side. The value of this constructed envelope in the benchmark point is compared with the value in the same benchmark point, obtained from the received signal in the divider 9. If these values coincide with a predetermined accuracy, the restorer 13 outputs a respective signal to the output former 14 which passes in this case the samples from the A/D converter 11 without changes.

If the restorer 13 detects a lack of coincidence of said values, i.e., if in a benchmark point a difference between values calculated using the sampling function and discovered in the received signal exceeds a predetermined threshold, a respective signal comes to the former 14, according to which signal this former 14 calculates correct values of samples distorted in the communication channel, and outputs these values.

It is expedient to implement the units 12–14 in software form.

In the Table are shown the results of simulation of communication system using the method according to the present invention. These results are obtained for the error event probability not worse than $10^{-8}$ in a telephone channel having a bandwidth 3.1 KHz. As indicated in this Table, the information transmission noise immunity in accordance with this method approximates to the Shannon threshold which is 39 Kbit/s for signal-to-noise ratio 40 dB. In so doing, the communication channel capacity increases as compared with the Viterbi encoding in which the channel capacity is reduced twice from a redundantless transmission.

INDUSTRIAL APPLICABILITY

This invention could be used in communications, measurements, and any other applications where it is necessary to transmit or convert an information without distortions.

Although the present invention was described with reference to its specific embodiment, this is by no means the limit of the patent claim scope which is defined by the enclosed Claims taking into account possible equivalents.

TABLE

| k | Physical transmission rate in the communication line, Kbit/s | Deceleration factor | Informational transmission rate, Kbit/s | Signal-to-noise ratio for errorless transmission, dB |
| --- | --- | --- | --- | --- |
| 2 | 15 | 4/5 | 12 | $\leq 15$ |
| 3 | 22 | 8/9 | 20 | $\leq 24$ |
| 4 | 30 | 12/13 | 27.8 | $\leq 33$ |
| 5 | 37.6 | 16/17 | 35.4 | $\leq 42$ |

The invention claimed is:

1. A method of noise-immune information transmission, including steps of:

at the transmitting side:

converting a sequence of k-bit informational digital samples (k is an integer, k>1) to an analog signal using a first sampling function;

supplementing the obtained analog signal with a redundant information signal;

transmitting the supplemented analog signal over a communication line;

at the receiving side:

receiving the transmitted analog signal from the communication line;

recovering from the received analog signal said sequence of informational digital samples;

correcting the recovered informational digital samples using the redundant information, characterized in that the method further includes the steps of at the transmitting side:

for each of n time intervals (n is an integer, n>1) consisting of m informational digital samples (m is an integer, m>1), selecting at least one benchmark point between informational samples;

in each selected benchmark point, determining an analog signal value to which said m informational digital samples of the given time interval are converted using a second sampling function, in the form of (k−i)-bit sample being the least significant bits of k-bit sample (i is an integer depending on a value of operation threshold of demodulator employed at the receiving side, k>i>1);

converting the samples in the n benchmark points to said redundant information signal at additional time intervals in order to supplement said analog signal;

selecting a difference between power levels for transmitting the most significant i bits of each k-bit informational sample depending on a predetermined signal-to-noise ratio at the input of the receiving side, wherein, selecting the power level difference for transmitting said (k−i)-bit samples of the benchmark points, a difference between which power levels is less than a difference selected for a power levels intended for transmitting said most significant i bits in order to have a greater protection of said most significant bits from interference;

at the receiving side:

according to the digital k-bit samples recovered from the received signal, discovering the least significant (k−i) bits by subtraction of the most significant i bits from said recovered samples;

according to the discovered least significant (k−i) bits, constructing an envelope using a second sampling function and discovering a value of this envelope in a respective benchmark point;

comparing the discovered value of the envelope in the specific benchmark point with the corresponding value recovered from the received signal;

in the case of coincidence of the compared values with a predetermined accuracy, deciding on a correct receiving of digital samples at the respective time interval;

in the case of lack of such coincidence of said compared values, choosing a set of (k−i)-bit digital samples, which set ensures the coincidence, which is the correction.

2. The method according to claim 1, characterizing in that the method includes a step of selecting, at each time interval, one benchmark point between the m-th informational digital sample of this time interval and the first informational digital sample of the next time interval.

3. The method according to claim 1, characterizing in that the method includes a step of selecting, at each time interval, two benchmark points between the digital samples of this time interval.

4. The method according to claim 2, characterizing in that each benchmark point is selected in the middle of the time space between respective digital samples.

5. The method according to claim 1, characterizing in that values of quantities n, m, k are chosen in the following limits: 1<n<128, 8<m<8192, 2<k<14.

* * * * *